Patented Sept. 1, 1931

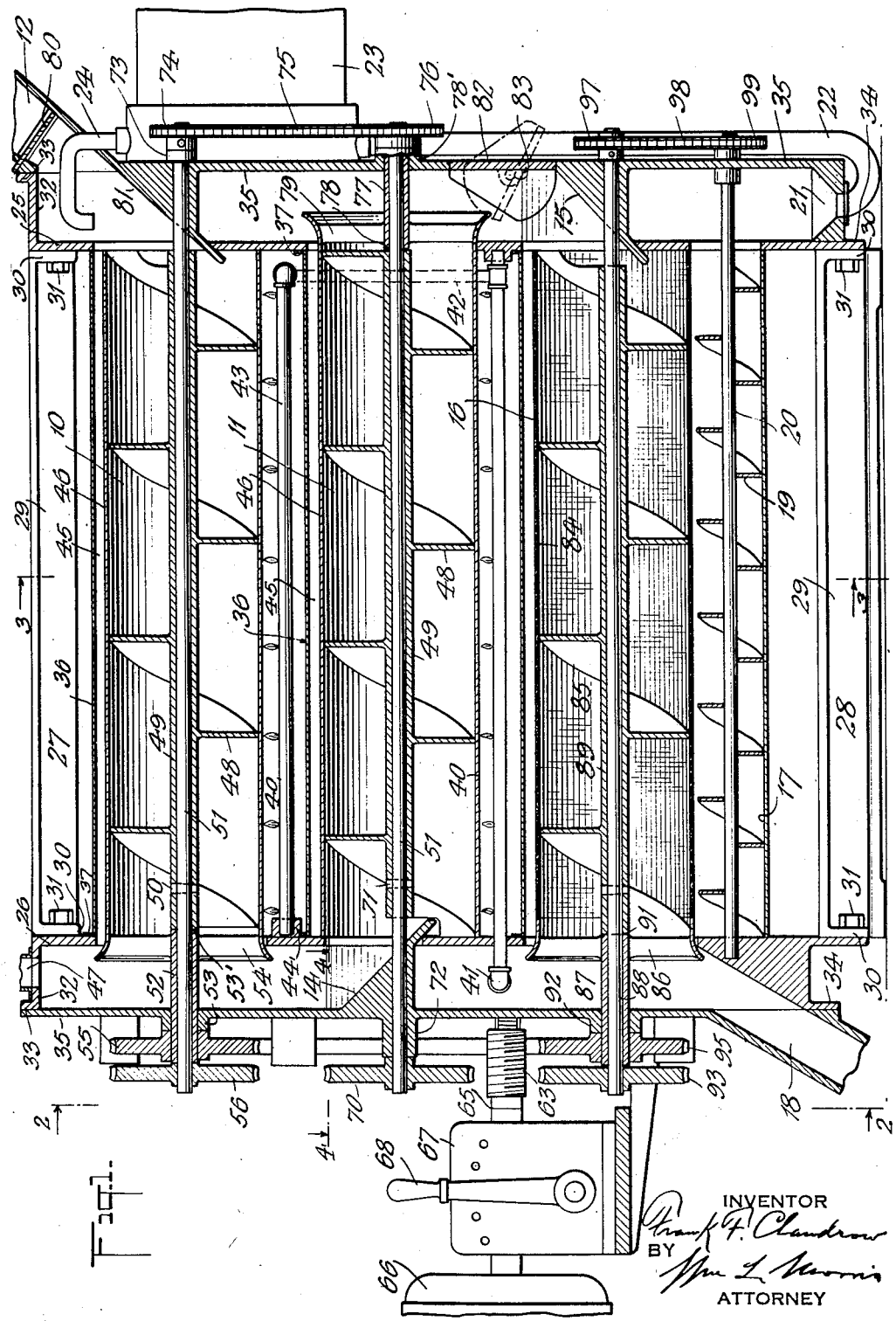

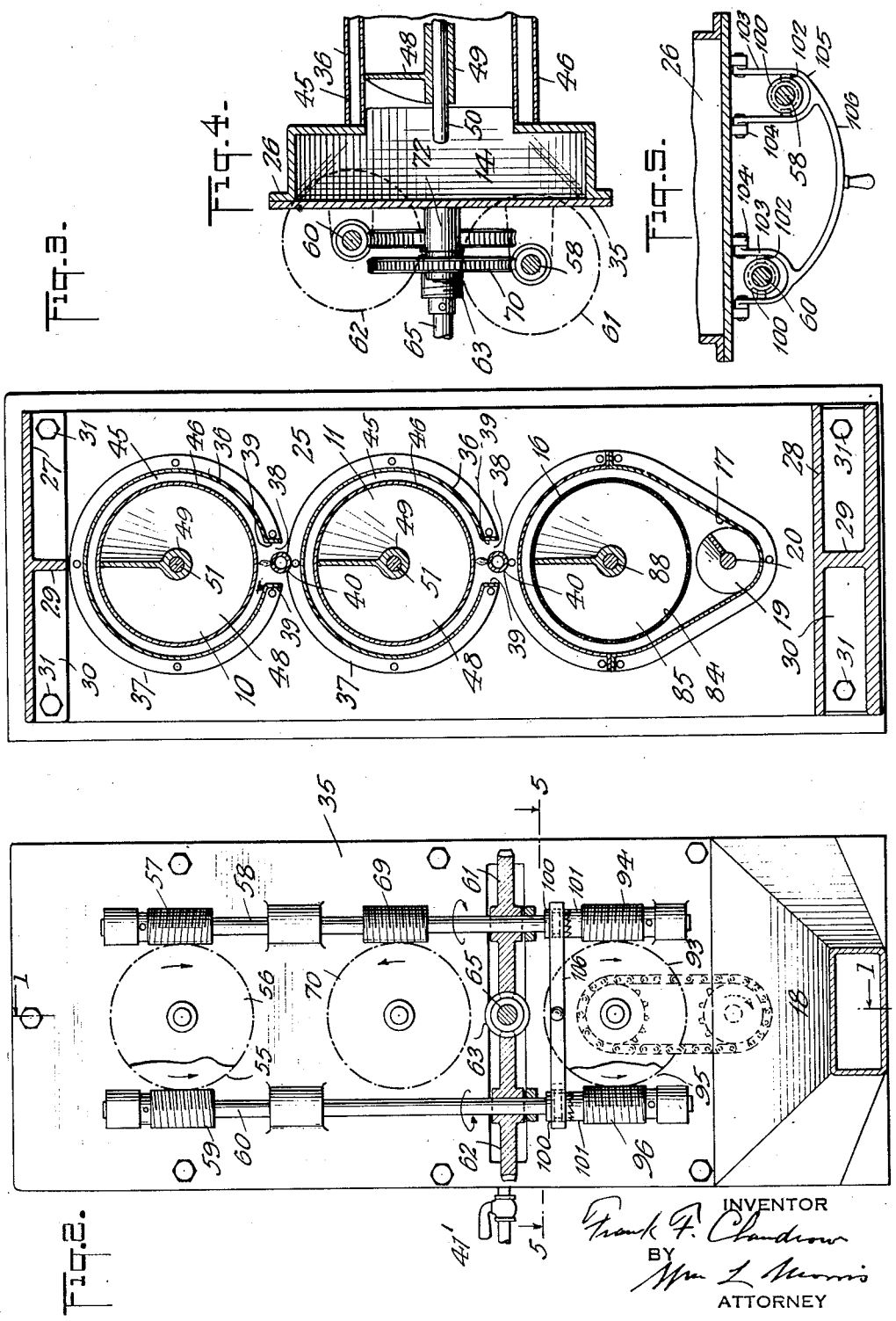
Sept. 1, 1931. F. F. CLANDROW 1,820,938
APPARATUS FOR ROASTING BEANS AND SEED
Filed Jan. 4, 1929 2 Sheets-Sheet 2

1,820,938

UNITED STATES PATENT OFFICE

FRANK F. CLANDROW, OF NEW YORK, N. Y.

APPARATUS FOR ROASTING BEANS AND SEED

Application filed January 4, 1929. Serial No. 330,217.

The present invention relates to apparatus for roasting beans and seed, of which a few examples are the coffee bean and the sunflower and pumpkin seed. More particularly, in certain embodiments of the invention it relates to apparatus in which the beans or seed in the roasting operation are otherwise treated, as for instance with salt.

According to the character of the bean or seed to be treated, and to the consistency, flavor or other attribute sought in the product and for uniformity of product, the beans or seed in each case should be subjected to a definite intensity of heat over a definite length of time; and these factors, as well as the stirring of the contents of the roaster should be automatically controlled and predetermined. Nevertheless, in the art, as heretofore practiced, much has been left to chance or to manual control, with the result that the product has been spoiled or impaired, either in whole or in part by burning, insufficient cooking, improper salting, lack of uniformity, or other defect.

An object of the present invention is a bean or seed roasting machine in the operation of which the elements of chance and manual control are eliminated, so that the product may be uniform, and correct as to quality, for the use desired. To this end, the operation of the machine involves an automatic, positive, time-feed, of the beans or seed over a given length of heating surface, and an automatic ejection of the beans or seed from such heating surface when the desired amount of roasting has been attained. In this connection, the machine, in the preferred embodiment of the invention, comprises one or more elongated containers or roasting chambers, set over a system of burners, and having worms or propellers within the same, or so positioned with respect thereto, as a force the beans or seed slowly along the hot containers; the amount of roasting being predetermined by the speed of the worms or propellers, the length of heating surface of the container or containers, and the intensity of heat from the burners. Where more than one heating container or roasting chamber is employed they are preferably arranged in a tier, with a drop chute from the ejecting end of one to the receiving end of the next, and with the propellers or worms acting in reverse direction in any two successive containers. Other suitable connections may, however, be made between roasting chambers; and, according to the nature of such connections the drive of the propellers or worms may, or may not, be reversed in two successive chambers. Other means of applying heat may also be employed.

A further object of the invention is a machine of the character mentioned, in which the beans or seed in their passage through the containers or roasting chambers are automatically stirred, so that all may have like contact with the heating surface, and so as to mix uniformly with the beans or seed such salt or other ingredient as may be employed to treat the beans or seed in the roasting operation. For this purpose, in the preferred embodiment of the invention, the containers or roasting chambers are automatically agitated. Preferably, the containers are cylindrical containers, mounted concentrically with the above mentioned propellers or worms, and having rotary movement relatively to the latter. Proper gearing may interconnect the several worms and container shafts so that all may be driven at their several selected and adjusted speeds from a single gear in the machine.

Other objects of the invention are, automatically to sift the free or excess salt, or the like, from the roasted beans or seed, and to return such salt for re-use into the current of beans or seed in, or entering, the roasting chamber or chambers. In the preferred form of the invention, hereinafter more specifically described, the mixture of roasted beans or seed, and salt, is delivered by a gravity chute from the roaster into an automatically rotated cylindrical sieve through which latter it is forced by a propeller or worm. During this passage the salt drops from the sieve to a trough below the same; and in this trough is a worm which feeds the ejected salt to means for returning the same to the hopper through which the beans or seed are fed to the roaster. An adjustable valve at the hopper controls the feed of the hopper-contents to the roaster, according to the nature of the material to be roasted and to other desired factors.

Other features of the invention will appear upon reference to the accompanying drawings, in which:

Fig. 1 is a longitudinal cross section through the apparatus on the line 1—1 of Fig. 2.

Fig. 2 is an end view of the apparatus looking from the left on the line 2—2 of Fig. 1.

Fig. 3 is a traverse cross section on the line 3—3 of Fig. 1.

Fig. 4 is a fragmentary view in cross section taken on the line 4—4 of Fig. 1.

Fig. 5 is a fragmentary cross section, to show the clutch, taken on the line 5—5 of Fig. 2.

Referring to the drawings, the apparatus is shown as comprising two roasting units 10 and 11, one set above the other and arranged in such manner that the beans or seed entering the upper heating unit through a hopper 12 at the upper right hand corner of the apparatus are fed longitudinally through the upper unit to the discharge end thereof at the left of the apparatus, whence they fall to a chute 14, which feeds them into the lower roasting unit at the left hand end thereof, whence they are fed through such second unit back to the right hand side of the apparatus. From the open right hand end of this second heating unit the now completely roasted beans or seed fall to a chute 15 which delivers the same into a sieve 16 through which the roasted beans or seed, together with the admixed salt, are fed back to the left hand side of the machine. During this last feed the salt is sifted out into a trough 17, and the beans or seed emerge from the open left hand end of the sieve to fall into a chute 18 by means of which they pass out of the machine. In the trough 17, is a worm 19 on a rotary shaft 20, which feeds the ejected salt to the right hand end of the machine where it falls into a chamber 21. From the foot of the chamber 21 a pipe 22 leads upward to a pump 23 and continues again at 24 into the chute 12; so that the dry salt falling into the chamber 21 is pumped up into the hopper 12 and into the incoming current of beans or seed to be fed again through the apparatus.

The elements above enumerated and others are supported upon a pair of standards 25 and 26, one at each end of the machine, and which may be of cast iron or other suitable material. These standards are held together by a pair of cross ties or braces 27 and 28, one at the top of the machine and the other at the bottom thereof. These ties, which may be of any suitable material, each have a central rib 29 for strengthening the same and have down turned end flanges 30 through which they are connected with the pair of standards 25 and 26 by bolts 31. Each of the standards 25 and 26 at top and bottom have outwardly offset flanges 32, terminating, at the top of the machine, in upwardly projecting lips or flanges 33 and at the bottom of the machine in downwardly projecting lips or flanges 34. To the upwardly and downwardly projecting lips or flanges 33 and 34 at each end of the apparatus is secured a plate 35. The flanges 32 and 34 are for the purpose of providing chambers at each end of the apparatus, between the uprights 25 and 26 and the plates 35, so as to provide for the feed of the beans or seed into the apparatus and from one unit to another unit thereof.

Each of the two heating units 10 and 11 comprise an outer cylinder 36 having at each end a flange 37 by means of which it is fixedly secured to the standards 25 and 26. These fixed cylinders 36, which are preferably of sheet metal, are not complete, in that, as shown more particularly in Fig. 3, they have longitudinal slots 38, formed by turned-down lips 39 in the bottom thereof. In, or immediately below, the elongated opening or slots 38 are set gas burners 40. These burners are in usual form of perforated pipes.

As shown more particularly in Fig. 1 the several burners are connected to form a single gas pipe line entering the machine from the rear at 41 on the left hand side, extending thence horizontally to the right hand side, thence upward at 42 and again at 43 to the left hand side of the machine where its closed end is supported in a lug 44 on the standard 26. A cock $41^1$ controls the flow of gas. The cylinders 36 are of a size to provide air chambers 45 between the same and the roasting drums or cylinders 46 which are concentrically mounted within the cylinders 36. The chambers 45 are closed at their right hand ends by the standard 25 but open at their left hand ends into the chamber formed by the standard 26 and the plate 35, from the upper end of which a vent 47 is provided. A hot air jacket with a vent from the machine is thereby provided for each roasting unit.

As hereinbefore mentioned each roasting unit comprises not only a drum 46 which is rotary, but also comprises, within such drum, a worm 48 which rotates relatively to the drum so as to effect a longitudinal feed of the beans or seed through the rotary drum. The drum 46 may conveniently be, in part at least, supported upon the periphery of the worm. As shown in Fig. 1 each of the worms 48 is carried by a sleeve 49 pinned or keyed as at 50 to a rotary shaft 51 of which there is one for each of the roasting units. These shafts pass through the standards 25 and 26 and through the plates 35 and have their bearings in the plates 35. Set for rotation upon the shaft 51 of the upper unit at the left hand end thereof is a sleeve 52 which has its bearing in a lug 53 on the left hand plate 35. This sleeve 52, which is separated from the worm-sleeve 49 at 53' carries on its inner end a spider 54 which is fast to and supports the left hand end of the upper roasting cylinder 46. Keyed to the left hand end of the sleeve 52 is a worm-gear 55 through which, as will presently be described, the upper roasting cylinder receives its rotary movement. The shaft 51 to which the worm of the upper unit is keyed extends beyond the sleeve 52 and has keyed to its left hand end a worm-gear 56 by means of which the worm of the upper unit receives its movement relative to the roasting cylinder of that unit. Meshing with the worm-gear 56, as shown in Fig. 2, is another worm-gear 57 fast on a vertical shaft 58. The worm-gear 55 for the drum of the upper unit meshes with a worm-gear 59 on a second vertical shaft 60. Below the roasting units the shaft 58 has another worm-gear 61 fast thereto; and the shaft 60 has another worm-gear 62 fast thereto. These worm-gears 61 and 62 mesh, respectively, with worm-gears 63 and 64 on a shaft 65 driven by a motor 66. The drive from the motor 66 to the shaft 65 is made through suitable speed-changing gears indicated at 67 whereby the speed of passage of the beans or seed through the machine may be regulated according to the nature of the beans or seed and to other desired conditions. For this purpose a speed changing handle is indicated at 68.

From the foregoing it will be seen that the rotary drive of the roasting cylinder and the worm of the upper unit are driven directly from the shafts 58 and 60 at any desired speed and relative speeds. Likewise the worm 48 of the lower roasting unit is driven directly from the shaft 58 by means of a worm-gear 69 fast on that shaft and in mesh with a worm-gear 70 keyed to the shaft 51 to which the worm 48 of the lower heating unit is keyed at 71. This lower shaft 51 like the upper one passes through the plate 35 on the left hand side of the machine and has its bearing in a lug 72 on that plate. It is otherwise, however, with the drive of the roasting drum of the lower unit. This lower roasting drum is driven from the worm shaft of the upper roasting unit. As shown in Fig. 1 the worm shaft 51 of the upper unit passes through the right hand plate 35 and has its bearing in a lug 73 on that plate. Keyed to the upper worm shaft 51 beyond the lug 73 is a sprocket 74 connected by means of a sprocket chain 75 with a sprocket 76 fast to a sleeve 77 on the worm shaft 51 of the lower unit and mounted for rotation relative to such shaft 51. This sleeve 77 is separated at 78 from the worm bearing sleeve 49 of the lower heating unit so that these two sleeves on the lower shaft 51 may move relatively one to the other. The sleeve 77 has bearing in a lug 78' on the right hand plate 35 and at its inner end has fast thereto a spider 79 which is fast to and supports at its right hand end the roasting drum of the lower unit. The sprockets 74 and 76 are of such relative size as to conform the drive of the lower roasting drum, from the upper worm shaft, to the speed of rotation of the upper roasting drum. It is to be borne in mind that the direction of rotation of the worms of the upper and lower roasting units are reversed with respect to each other so that the direction of feed of the beans or seed is to the left in the upper unit and to the right in the lower unit. To this end, the gears 56 and 57 are cut opposite to the gears 69 and 70, so that, although driven from the same shaft 58, the direction of drives in the heating units, as shown by the arrows in Fig. 2, are opposite.

The speed of feed of the beans or seed through the hopper 12 may be regulated by a valve shown as a slidable gate 80 at the upper right hand corner of the machine. From the gate 80 the beans or seed, and salt, if the latter is used, pass down a plate 81 into the open end of the upper heating drum being forced through the upper heating drum by its worm 48 while being stirred by the rotary movement of the upper heating drum. The partly roasted mixture passes through the spider 54 at the left hand end of the upper heating drum and falls to the plate 14 whence it is guided into the open end of the lower heating drum, to be fed in the same manner rightward, and through the spider 79 at the right hand end of the lower heating unit. The beans or seed are now completely roasted and may be immediately ejected from the machine, particularly where no salt has been used and no sifting is therefore desired. For this purpose there is mounted on the right hand plate 35 a chute 82 for directing the roasted material from the lower roasting drum to the exterior of the machine.

Where salt has been used, however, and a sifting out of the salt is desired in the machine, the material coming from the lower roasting drum 46 is directed by the chute 82, not to the exterior of the machine, but to the rotary sieve below the lower heating unit. The chute 82 is therefore shown as pivotally mounted at 83 on a plate 35, so that it may be rocked between the full and dotted line positions. In the full line position it directs the beans or seed, as indicated at 15, into a rotary sieve cylinder 84. Within this sieve cylinder 84 and in part supporting the same is a worm 85 for forcing leftward the mixture of roasted beans or seed and salt which are now being separated by the sifting action. The sieve cylinder 84 is open at its right hand end, but at its left hand end is fast to a spider 86 which in turn is fast to and is carried by a sleeve 87 which is free to rotate relatively to a shaft 88 on which such sleeve has its bearing. The shaft 88 is the shaft which drives the worm 85 in the sieve. This worm, like the other worms, is fast to a sleeve 89 keyed at 90 to the shaft 88. The sleeves 89 and 87 are separated at 91 so that the worm and the sieve drum may have relative movement. The worm shaft 88 passes through the left hand plate 35 and has its bearing in a lug 92 therein. Fast to the shaft 88 is a worm 93 which meshes with a worm 94 on the vertical shaft 58 and provides connection to the motor 66 for driving the worm. Fast to the sleeve 87 is a worm gear 95 meshed with a worm gear 96 on the shaft 60. Both the worm and the sieve drum are driven directly from their respective shafts 58 and 60.

On emerging from the sieve cylinder through the spider 86 thereof the roasted or cleaned beans or seed pass, as hereinbefore stated, from the machine through the chute 18. Also as hereinbefore stated the salt which has been sifted therefrom is dropped into the trough 17 where it is engaged by the worm 19, driven by the shaft 20 to force the salt rightward into the chamber 21 so that it may be forced by the pump 23 through the pipe 22 back to the hopper 12. The shaft 20 is driven from the worm shaft 88 of the sieve. For this purpose the shaft 88 which bears at its right hand end in the right hand plate 35 has keyed thereto a sprocket 97 connected by a sprocket chain 98 to a sprocket 99 fast on the worm shaft 20.

Since as hereinbefore indicated it may not always be desired to use the sieve, the entire sieve unit may be disconnected or connected at will to the motor drive shaft. For this purpose, as more particularly shown in Figs. 2 and 5, the connection of the worm gears 94 and 95 on the shafts 58 and 60 are clutch controlled, one element 100 of which clutch is fast to the corresponding vertical shaft and the other element 101 fast to the gears 94 or 96 as the case may be. The elements 100, however, while fast to their respective shafts, so far as rotary movement is concerned, are slidable thereon into and out of contact with the clutch elements 101. For this purpose the clutch elements 100 are provided with pins 102 engaged by arms 103 pivoted at 104 to the plate 36. The pins 102 also carry yokes 105 to which the clutch operating handle 106 is secured. The pins 102 have slot connection with the arms 103 to permit of a swinging movement of the clutch handle with the vertical movement of the clutch members 100. By throwing the handle, 106, therefore, the sieve and salt returning units may be rendered inoperative.

I claim:

1. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders, and means for driving the worm shafts and cylinder sleeves.

2. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders, and means for driving the worm shafts and cylinder sleeves, a feed chute supplying material to one end of the upper roasting cylinder and a chute receiving material from the other end of the cylinder and guiding it to the next lower cylinder.

3. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders and means for driving the worm shafts and cylinder sleeves, a cylindrical screen below the lower roasting cylinder, a worm within the screen, a worm shaft rotatably mounted below the lower roasting cylinder and carrying the screen, and means for driving the shaft and screen.

4. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders and means for driving the worm shafts and cylinder sleeves, a cylindrical screen below the lower roasting cylinder, a worm within the screen, a worm shaft rotatably mounted below the lower roasting cylinder and carrying the screen, and means for driving the shaft and screen, and a chute receiving material from the lower roasting cylinder and delivering it to one end of the screen.

5. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders and means for driving the worm shafts and cylinder sleeves, a cylindrical screen below the lower roasting cylinder, a worm within the screen, a worm shaft rotatably mounted below the lower roasting cylinder and carrying the screen, and means for driving the shaft and screen, a trough below the screen to receive material such as salt, a worm revoluble in the trough, a work shaft, and means for driving the shaft.

6. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders and means for driving the worm shafts and cylinder sleeves, a cylindrical screen below the lower roasting cylinder, a worm within the screen, a worm shaft rotatably mounted below the lower roasting cylinder and carrying the screen, and means for driving the shaft and screen, and a valve movable to discharge roasted material directly from the lower roasting cylinder or to permit material to pass from said cylinder to the screen.

7. A roaster for purposes described, comprising a frame, superposed heating jackets, a roasting cylinder in each jacket and spaced therefrom, a feed worm in and revoluble with respect to each cylinder, shafts supporting the worms, sleeves revoluble on the shafts and connected to corresponding cylinders and means for driving the worm shafts and cylinder sleeves, a cylindrical screen below the lower roasting cylinder, a worm within the screen, a worm shaft rotatably mounted below the lower roasting cylinder and carrying the screen, and means for driving the shaft and screen, said driving means including a primary driver and change speed gearing intermediate the driver and the various worm shafts and sleeves.

8. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts, and cylinder sleeves.

9. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a feed chute passing through one of the frame uprights and arranged to supply material to one end of the upper roasting cylinder, and a chute within the other frame upright to receive material from the other end of the cylinder and supply it to the next lower cylinder.

10. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revolubly on the shaft, passing through a frame upright and connected to the screen, and means exterior to a frame upright for driving the shaft and sleeve.

11. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revolubly on the shaft, passing through a frame upright and connected to the screen, and means exterior to a frame upright for driving the shaft and sleeve, and a chute within a frame upright to receive material from the lower roasting cylinder and deliver it to one end of the screen.

12. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revoluble on the shaft, passing through a frame upright and connected to the screen, and means exterior to a frame upright for driving the shaft and sleeve, and a chute passing through the other frame upright to receive material from the other end of the screen and discharge it from the machine.

13. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revoluble on the shaft, passing through a frame upright and connected to the screen, and means exterior to a frame upright for driving the shaft and sleeve, a trough below the screen to receive material such as salt, a worm revoluble in the trough, a worm shaft extending through a frame upright, and means exterior to the upright for driving the shaft.

14. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revoluble on the shaft, passing through a frame upright and connected to the screen, and means exterior to a frame upright for driving the shaft and sleeve, a trough below the screen to receive material such as salt, a worm revoluble in the trough, a worm shaft extending through a frame upright, and means exterior to the upright for driving the shaft, the trough being arranged to discharge into a frame upright, and means including a conduit and a pump for removing such discharged material and supplying it to the feed chute for re-use.

15. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revolubly on the shaft, passing through a frame upright and connected to the screen, and means exterior to a frame upright for driving the shaft and sleeve, and a valve in an outer wall of a frame upright, movable to discharge roasted material directly from the lower roasting cylinder or to permit material to pass from said cylinder to the screen.

16. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revolubly on the shaft, passing through a frame upright and connected to the screen, and means exterior to a frame upright for driving the shaft and sleeve, a trough below the screen to receive material such as salt, a worm revoluble in the trough, a worm shaft extending through a frame upright, and means exterior to the upright for driving the shaft, said driving means including a primary driver and change-speed gearing intermediate the driver and the various worm shafts and sleeves.

17. A roaster for purposes described, comprising frame uprights of substantially box form providing therein passages for gases and treated material, superposed heating jackets connecting apertures in inner walls of the uprights, a roasting cylinder in each jacket and spaced therefrom, a feed worm in each cylinder, shafts supporting the worms and extending through the uprights, sleeves revoluble on the shafts, extending through frame uprights and connected to corresponding cylinders, and means exterior to the frame uprights for driving the worm shafts and cylinder sleeves, a revoluble cylindrical screen below the lower roasting cylinder, a worm within the screen, a worm shaft passing through the frame uprights, a sleeve revolubly on the shaft, passing through a frame upright and connected to the screen, and means exterior to a frame upright for driving the shaft and sleeve, a trough below the screen to receive material such as salt, a worm revoluble in the trough, a worm shaft extending through a frame upright, and means exterior to the upright for driving the shaft, said driving means including a primary driver and change-speed gearing intermediate the driver and the various worm shafts and sleeves, and means for operatively connecting and disconnecting the screen, screen worm and worm in the discharge trough.

Signed at New York, in the county of New York and State of New York, this 14th day of December, 1928.

FRANK F. CLANDROW.